June 23, 1970 — A. H. WILLINGER — 3,516,543

WATER CONDITIONING DEVICE

Filed May 23, 1967 — 2 Sheets-Sheet 1

INVENTOR.
ALLAN H. WILLINGER

BY
Friedman & Goodman
ATTORNEYS

June 23, 1970  A. H. WILLINGER  3,516,543
WATER CONDITIONING DEVICE
Filed May 23, 1967
2 Sheets-Sheet 2
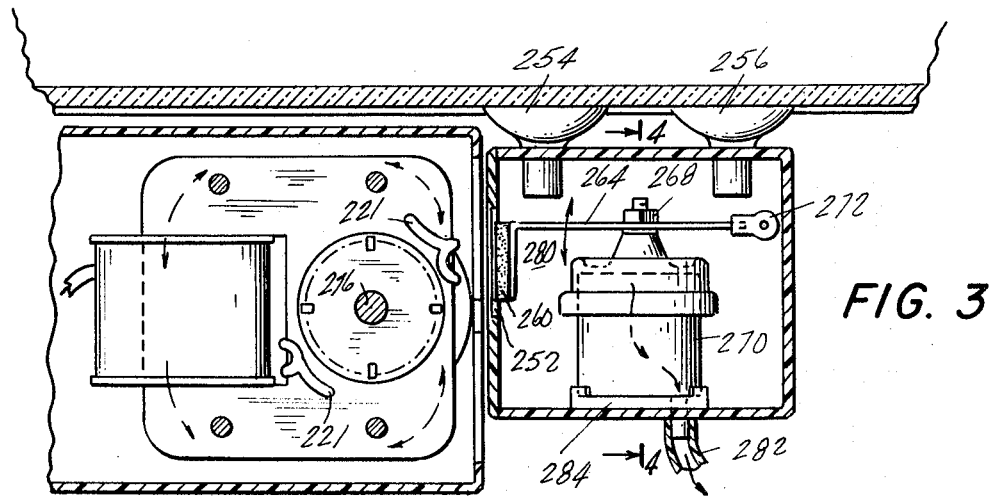
FIG. 3
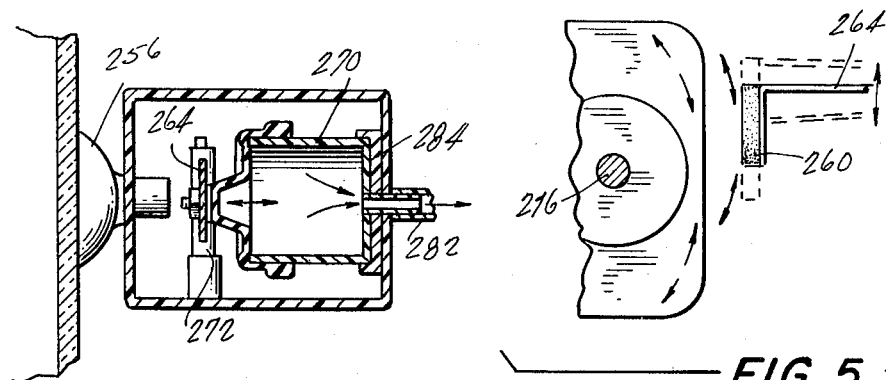
FIG. 4
FIG. 5
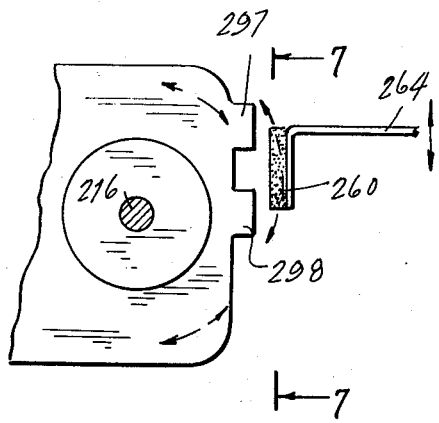
FIG. 6
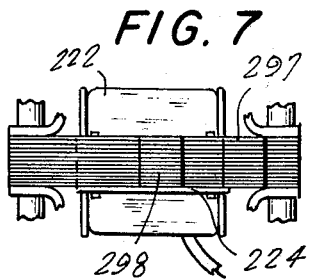
FIG. 7
INVENTOR.
ALLAN H. WILLINGER
BY
ATTORNEYS

United States Patent Office 3,516,543
Patented June 23, 1970

3,516,543
WATER CONDITIONING DEVICE
Allan H. Willinger, New Rochelle, N.Y., assignor, by mesne assignments, to Mattel-Aquarium, Inc., Hawthorne, Calif., a corporation of Delaware
Continuation-in-part of application Ser. No. 376,105, June 18, 1964. This application May 23, 1967, Ser. No. 640,605
Int. Cl. E04h 3/20
U.S. Cl. 210—169      8 Claims

ABSTRACT OF THE DISCLOSURE

This invention and this disclosure are directed to the combination of a rotary electric motor operated aquarium apparatus with a vibratory operated aquarium air pump. More particularly, this invention and this disclosure are directed to the combination of an aquarium water filter means with an aquarium air pump which derive their motive power from the same simple, low-cost motor, said units being independently housed. The preferred embodiment of this invention combines a filtration system employing a shaded pole induction motor operable to rotate a magnet to turn an impeller to circulate water through the filtration system in combination with a vibratory bellows system for supplying air to the aquarium or an apparatus located therein, responsive to the same motor.

RELATIONSHIP WITH PRIOR APPLICATIONS

This application is a continuation-in-part of my copending application Ser. No. 376,105, filed June 18, 1964, entitled Aquarium Filter Apparatus, now U.S. Pat. 3,321,081 and my copending application Ser. No. 565,444, filed July 15, 1966, entitled Aquarium Water Conditioning Apparatus, now U.S. Pat. 3,392,836.

BACKGROUND OF THE INVENTION

Field of the invention

This invention relates to an aquarium air pump operable in combination with another aquarium device such as a filter apparatus for conditioning the water on a shared power basis. More particularly, this invention relates to a combined filtration-aeration system whereby by employing a single simple electric motor the essential features of water filtration and air compression are accomplished.

Discussion of the prior art

The filtration and aeration of aquarium water, particularly the types of aquariums for tropical fish, have been carried out as two distinct albeit essential operations in the maintenance of an aquarium. Means have been provided to filter the water through a floss of glass fiber or other textile type floss material or charcoal. A magnetic vibrator operated bellows pump was employed independently to add air to the water to make it better for the sustainment of fish and plant life and to operate animated aquarium ornaments and the like.

In my first copending application, I disclose an aquarium water circulation and filtration device for use in connection with the aquarium hobby, wherein water circulation through the device and an aquarium is accomplished by means of a pump which is operated by means of an electric motor, the shaft of which is magnetically coupled thereto through a wall of the device. A receptacle is provided to be mounted externally of the aquarium tank and houses a filtration arrangement. The receptacle is also provided with pumping means which induces the circulation of water from the aquarium through the filtration arrangement within the receptacle and returns it to the aquarium in a continuous flow in filtered condition. The latter mentioned copending application discloses an arrangement of the filter receptacle for receiving the water from the aquarium tank in filtered condition, pump means for circulating the aquarium water in the manner indicated and electric motor means for operating said pump means wherein the motor is disposed in heat transfer relation with the receptacle and the water circulating therethrough.

Since there has never been heretofore provided a means whereby the aforesaid or other desired aquarium maintenance functions can be carried out together using a single simple motor, the prior art has had to resort to two distinct motors or power means not operating in combination. This substantially increased the cost of the aquarium hobby.

SUMMARY OF THE INVENTION

Objects of the invention

It is an object of this invention, therefore, to provide a combined aquarium accessory-air supply system for aquarium conditioning and the like.

It is still another object of this invention, therefore, to provide such a combined filtration-aeration system which operates off of one simple, inexpensive, uncomplicated electric motor in a novel and unique manner.

It is still another object of this invention, therefore, to provide such a combined aquarium accessory-air supply system which operates off of one simple electric motor wherein the accessory operating motor and actuating means is independently housed from the air supply means.

These and other objects and advantages of my invention will become apparent from the following complete description taken in view of the accompanying drawings and appended claims.

STATEMENT OF THE INVENTION

This invention is an improvement in an aquarium accessory operating device such as, for example, a water conditioning device comprising a filter receptacle for receiving water from an aquarium tank, filtering it and restoring the same to the tank in filtered condition, pump means for circulating the aquarium water in the manner indicated, a shaded pole induction motor for operating said pump means in combination with an air pumping device operable from the same power source. The improvement resides in the provision of an air pumping unit having a vibrating armature for operating a bellows element in depressing relationship therewith, said armature being provided with a magnetic piece disposed in facing but not abutting relationship with the region of the shading coil of the shaded pole induction motor, said magnetic piece being operable by mean of the varying magnetic field induced in the region to oscillate the magnet carrying armature and thus periodically to depress said bellows element to thus induce an air flow. The bellows element which functions with the magnet mounting armature to pump air out of the port to the tank is thus capable of being housed independently from the associated aquarium accessory and the shaded pole induction motor.

BRIEF DESCRIPTION OF THE DRAWINGS

The instant invention will be more readily understood and appreciated by reference to the accompanying drawings illustrating a preferred embodiment of my invention. In the drawings:

FIG. 3 is a sectional view taken along the line 3—3 of FIG. 2;

FIG. 4 is a sectional view taken along the line 4—4 of FIG. 3;

FIG. 5 is a partial view of the view of FIG. 3 showing the movement of the magnet employed in the aeration means;

FIG. 6 is an embodiment of the invention employing parallel protruding pole pieces from the laminations on the stator of the shaded pole induction motor; and FIG. 7 is a sectional view taken along the line 7—7 of FIG. 6.

DESCRIPTION OF THE PREFERRED EMBODIMENT

Figure 1:
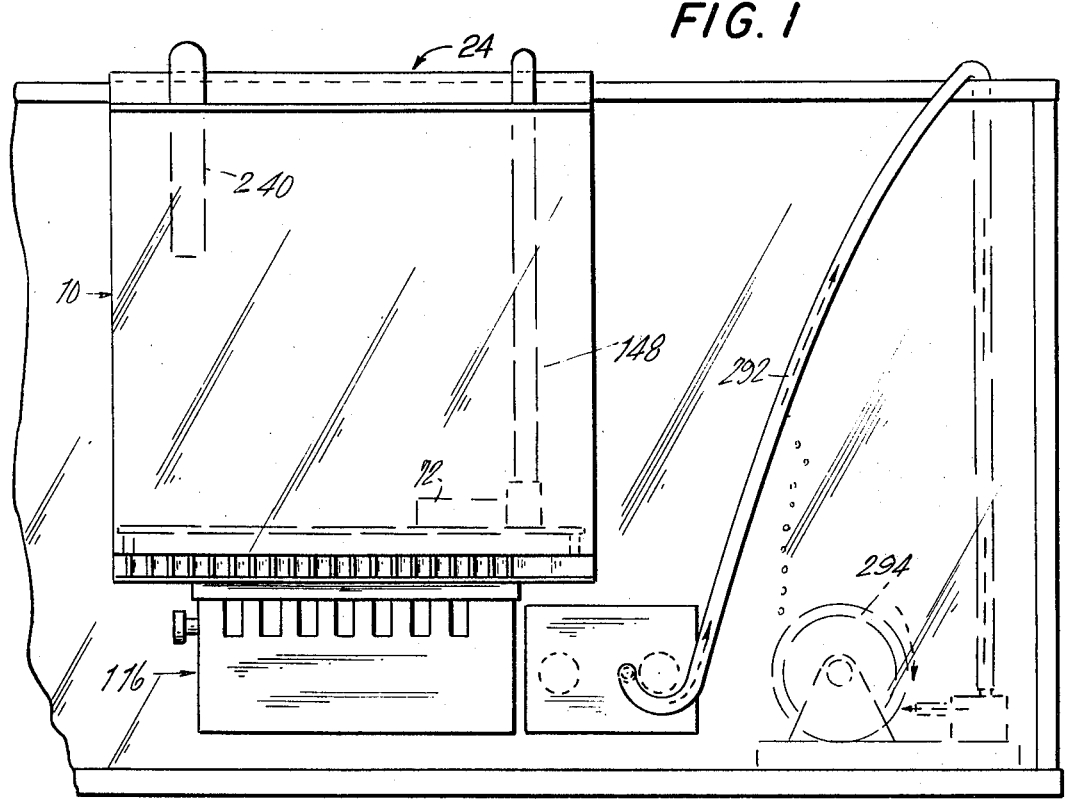
FIG. 1 is a side view showing the combined filtration-aeration system on an aquarium tank and the air feed hose in position to drive an ornamental water wheel within the aquarium tank.

Referring now to the drawings in detail, there is shown an aquarium water circulating and filtering device such as is generally shown and described in my aforesaid applications, the disclosures of which are herein incorporated by reference. The aquarium conditioning device is designated generally by the numeral 10 and is of the external type, and, as here shown, comprises a receptacle 24 which is adapted to be suspended on the outer surface of an aquarium tank by well known means, not here shown in detail.

Figure 2:
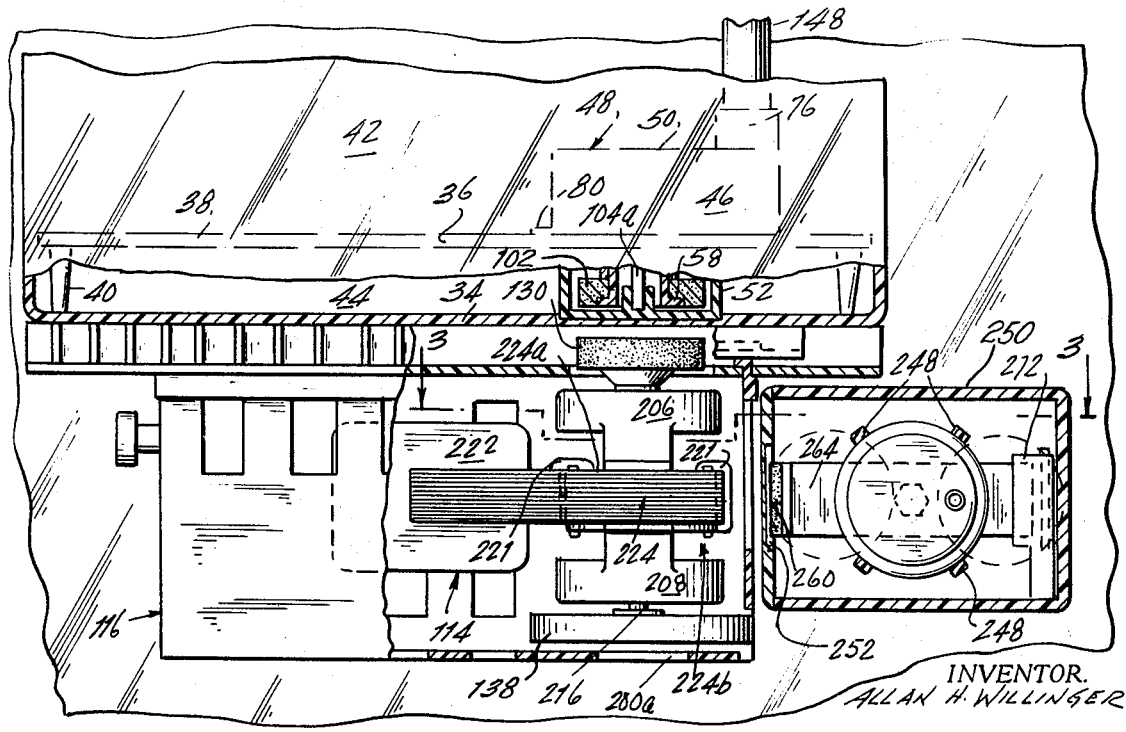
FIG. 2 is a partial view of the apparatus of FIG. 1 with the housing for the motor and the aeration unit partially broken away to show the parts.

The filter receptacle 24 is essentially of rectangular conformation and is provided with a bottom wall 34 on which there is mounted a platform 36. The platform is provided with a plurality of perforations or slots 38 and is provided at several locations thereof with legs 40. The legs 40 dispose the rectangular platform 36 in spaced relation above the bottom wall 34 of the filter receptacle as shown in FIG. 2. The platform, when seated within the filter receptacle, serves to define with the latter a pair of chambers 42 and 44. Chamber 44 is defined below the platform 36 and is referred to as a clean water chamber, and the chamber 42 defined above the platform is referred to as a filter chamber.

The platform 36 mounts a centrifugal pump arrangement which is generally indicated by the reference numeral 48 and is described in detail in the aforesaid applications. It comprises an upper housing member 50 and a lower cooperating member 52. The lower housing member 52 is a cylindrical element having a substantially circular bottom wall and is mounted on the lower surface of the platform 36 by means of hangers extending from its vertically disposed cylindrical bounding wall. The bounding wall is apertured to define water ports or passage through the lower housing member 52. An aperture, not shown, is provided in the platform 36 to provide a passage between the upper and lower housing members. The bottom wall of lower housing member 52 is also provided with an upwardly extending central bearing seat 58.

The upper housing member 50 is a cylindrical element having a substantially circular top wall 73 from which there depends a cylindrical vertical wall. The top wall 72 is provided eccentrically thereof with an integral, upwardly extending tubular segment 76. The tubular segment 76 is provided with a circular shoulder or detent, not shown, upon which the water return tube 148 rests.

The platform 36 which is provided with the previously described aperture adjacent one end 81 thereof, is provided also between the aperture and the end with an integral upwardly extending water-flow-directing portion more fully described in the aforesaid applications. The upper housing member 50 is mounted on the upper surface of the platform 36 immediately above the lower housing 52, so as to define the pump housing 48 therewith. Specifically, the flange 80 of the upper housing member 50 is suitably secured in a substantially permanent manner, as by a suitable adhesive or solvent bond, to the upper surface of the platform 36. The lower housing member 52 may be similarly secured to the lower surface of the platform 36, or it may be removably mounted by means of the hangers as is more fully described in my earlier filed copending application. In this connection, it will be understood that the platform 36 and each of the upper and lower housing members are preferably formed, as by molding or otherwise, from a suitable plastic. The receptacle 24 is also formed of a suitable material for a filter housing, preferably a molded plastic.

Hence, it is seen that with the upper housing member 50, substantially permanently secured to the upper surface of the platform 36 and with the lower housing member 52 removably secured to the lower surface of the platform 36, so that the upper and lower housing members are in vertical alignment with the aperture between the upper and lower housing members, there is defined the previously mentioned pump casing 48.

As described in the aforementioned applications, the movable parts of the pump comprise an impeller and a magnetic rotor. The impeller comprises a hollow shaft having several radially-spaced, outwardly extending integral impeller blades each of which is provided with an inwardly extending pin. The blades and fins are preferably formed integral with the shaft, the entire impeller being preferably molded of a suitable plastic material. Thus, the impeller comprises a hollow shaft which is open at the lower end thereof and which is provided at the upper end thereof with a wall in which there is defined a central aperture as shown in said applications, the impeller having several radially-related, outwardly extending impeller blades at the closed upper end thereof, and there also being the same number of radially-related fins which extend into the hollow interior of the shaft at the upper end thereof, there being a fin continuous with the impeller blade.

As here shown, the magnetic rotor 102 comprises a preferably ceramic magnet which is mounted on a hollow, preferably plastic, sleeve. The ceramic magnet is of well known construction and, more specifically, the magnet is of the type which is polarized with alternate north and south poles on the lower face thereof. It should be noted that the hollow sleeve extends above the upper surface of the magnet and the magnetic rotor is assembled with the impeller which lies in substantially a parallel plane therewith. It is assembled by virtue of frictional engagement of the projecting portion of the sleeve into the hollow shaft through the open bottom thereof, it being understood that the sleeve has a relatively tight adhesive or solvent bonded engagement within the hollow shaft.

In order to mount the impeller rotor assembly, the vertical bearing shaft 104a is seated within the previously described bearing seat 58, the lower end of the shaft extending into the seat. A ball is positioned at the top of ferrule 104a in a seat and it is urged or forced into position so that it is firmly seated or engaged between the inner end or free ends of the fins. The metal ferrule or bearing shaft 104a extends through the rotor sleeve and the hollow impeller shaft. Consequently, it will be apparent that the ball which is frictionally engaged with the fins of the impeller mounts both the latter and the rotor 102 on the head of the bearing shaft 104a.

In order to operate the centrifugal pump 46, provision is made for an electric motor 114 of the shaded pole induction type. The shaded pole induction motor 114 is mounted within a motor housing 116. The motor 114 is provided with a shaft 216 at the upper end of which there is mounted a ceramic magnet 130 which is disposed by the shaft 216 within an upwardly-raised portion of the housing 116. It will be understood that the magnet 130 is the same type of magnet as the previously mentioned magnet 102, preferably a ceramic magnet which is oppositely polarized at its outer face or upper face. The housing 116 is placed to secure optimum magnetic coupling between the confronting faces of said magnets.

The motor is of the squirrel-cage type comprising a laminated stator which carries a field coil 222. A portion of each stator pole is "shaded" by a single turn of heavy copper wire called a shading coil 221. The motor rotor assembly 224 is also of laminar construction and is rotatably mounted within the stator field by means of a vertically disposed motor shaft 216 which is received within the upper and lower end bearings 206 and 208, respectively. The upper end of motor shaft 216 carries the motor magnet 130 which is mounted thereon for rotation therewith. The lower end of the motor rotor shaft is provided with a synchronizing wheel 138 which is advantageously provided with radial fan blades extending between its hub and rim for aiding in the circulation of air about the motor particularly as the air enters aperture 200a in the bottom wall of housing 116. Motor shaft 216 is also provided with upper and lower thrust bearings omitted from the drawings. These bearings are slidably mounted on the motor rotor shaft above and below the rotor laminations and are provided with planar end faces which form the thrust bearing surfaces. The spacing between the exposed face laminations 224a and 224b of the motor rotor 224 and the end bearings with which they are respectively in confronting relation exceeds the axial dimension of each of the thrust bearings so that the motor rotor shaft is free for movement in a vertical direction to the extent of this difference in dimensions. Thus, the lower thrust bearing will normally rest upon the upper face of end bearing 208 and carry the weight of the rotor assembly since the lowermost lamination 224b of the motor rotor rests upon the upper face of the same thrust bearing. The upper thrust bearing carries no weight and merely rests against the upper face lamination 224a being spaced from the upper end bearing as shown in my prior applications. This construction permits the "free floating" effect spoken of in the second application minimizing motor wear.

The foregoing is a description of the means employed to achieve filtering with special emphasis being put on the location of the shaded pole induction motor for I have found that this motor can be utilized to work a bellows air pump mechanism in a separate housing without any strain on the motor. By doing this the functions of filtration and aeration are performed together. It is done by providing an aeration means housing 250 suitably constructed of a light-weight plastic material, e.g. polyethylene, polystyrene. Housing 250 may have a window or a thinned wall portion 252 therein and is held against the tank by suction cups 254 and 256 which are secured to housing 250. Other means of securement may be employed such as adhesive coated plastic foam or tape. Within housing 250 is a magnet 260 secured to L-shaped armature 264 which is fastened via screw 268 to the center of rubber bellows element 270 and is mounted for resilient deflection by means of the member 272. Magnet 260 is polarized transversely of its smaller dimension so that one of its poles is disposed in face-to-face relationship with the region of shading coil 221 wrapped about the stator laminations and existing as a thick copper wire as is conventional with motors of this type. The relationship is shown particularly in FIGS. 3, 5 and 6. The rubber bellows element is provided with suitable air intake means and valves such as air intake valves 248 permitting air passage into the bellows when the bellows is not depressed. It is constructed of light-weight material so as to be readily collapsed partially when the magnet 260 causes L-shaped armature 264 to oscillate in the direction of arrows 280. Referring to FIG. 3, when the armature is forced downward bellows 270 partially collapses causing movement of air out air discharge port 282. Bellows 270 is held by frame 284 adjacent the air discharge port 282 against housing 250.

The operation of the mechanism is very simple and, as far as the filtration system is concerned, has been described in the aforementioned applications. The shaded coil induction motor is plugged into an A.C. current source. The principle of operation of motors of this type has been said to be based upon the fact that alternating current passes through the main stator winding 222 creating a magnetic field in the stator which is transferred to the rotor due to the influence of the shading coil which makes the flux in the portion of the pole piece surrounded by it lag behind the flux in the other portion of the pole. The shifting of the flux thus produced develops sufficient torque to enable rotor to revolve under the light load conditions. Any aquarium accessory may thus be operated by the rotor, either by direct mechanical coupling thereto or as in the case of the filtration device described, by magnetic coupling for rotary motion. The significant contribution of the instant invention is the additional utilization of the varying or alternating magnetic field developed in the field coil and stator laminations, and particularly in the region of the shading coil, for operating an oscillating device, particularly a vibratory aquarium air pump on a simultaneous basis and without apparently loading the motor.

Thus, the magnet 260 is caused to oscillate back and forth about the region of the shading coil in accordance with the directional arrows causing armature 264 to alternately depress and elevate bellows 270 causing air to pass out air discharge port 282 which passes through the connecting tube 292. The air passes out and drives ornamental water wheel 294 and may provide air for operating any other aquarium ornament or device in the tank. The entire operation is simple and substantially noiseless.

In the embodiment shown in FIGS. 6 and 7, parallel pole pieces 297 and 298 are provided to accentuate the phenomenon. These pole pieces may be secured to the stator laminations or preferably and as shown, the laminations may be initially stamped with the projecting tongues, which when assembled, form integral pole pieces flanking the shading coil or ring. This phenomenon apparently due to the alternating character of the current causes the magnet deflection to oscillate back and forth in accordance with the directional arrows. The oscillation is sufficient to supply ample air to the aquarium tank or, for example, to keep an ornamental water wheel constantly turning or to operate a filter of the air driven type.

From the foregoing it is readily apparent that I have provided a significant advance in the art of filtration and aeration of aquarium water which is particularly suitable for home fish tanks, especially the "community" aquarium type. My invention enables the removal of the motor unit and the filtration unit merely by removing it as if it did not operate in cooperation with the aeration system. This can be done because the aeration system is separately housed and held to the aquarium by suitable means, e.g. suction cups. Hence, cleaning the unit is facilitated. The entire unit saves an initial capital outlay for this hobby and in maintenance cost by cutting down on the number of electrical motors needed. The amount of air moved by the pump unit may, if desired, be regulated by varying the distance of the motor unit from the air pump unit. The elimination of the electrical apparatus usually housed in aquarium air pumps make it of sufficiently light weight to permit it to be supported by means of the suction cups. Pressure sensitive adhesives or tapes may also be employed.

The terms and expressions used herein are terms of description and not of limitation as there is no intention in the use of such terms and expressions of excluding any equivalents, or portions thereof, as various modifications and departures from the above disclosure are possible within the scope of the invention claimed.

I claim:
1. The combination of an electric motor actuated rotationally operated aquarium accessory and an oscillating element operated air pump wherein the oscillating element of said air pump has secured thereto a permanently magnetized member and said electric motor, when energized develops an alternating magnetic field, said magnetized member being disposed in the region of said field to impart an oscillating motion to the oscillating element of said pump and operate the same.

2. The improvement according to claim 1, wherein said accessory and said air pump are independently housed.

3. The improvement according to claim 1, wherein said accessory, said electric motor and said air pump are each provided in an independent housing.

4. The improvement according to claim 1, wherein said air pump is contained in a housing having at least one suction cup for removable securement to the wall of an aquarium tank.

5. The improvement according to claim 1, wherein said air pump is contained in a housing provided with a pressure sensitive adhesive area for securement to the wall of an aquarium tank.

6. The improvement according to claim 1, wherein said air pump is contained in a housing and said housing is provided with means for detachably securing the same to the wall of an aquarium tank.

7. In combination with an aquarium device operated by an electric motor having a rotor in operative relation with the device and a stator wherein an alternating magnetic field is developed, air pump means, said pump means comprising an expansible chamber, an oscillating armature of magnetically attractable material for periodically changing the volume of said chamber, a portion of said armature being disposed in the region of the alternating magnetic field developed by said motor for movement in accordance therewith, thereby causing said armature to be oscillated to produce a pumping action in said chamber.

8. In combination with an aquarium device operated by an electric motor having a rotor in operative relation with the device and a stator wherein an alternating magnetic field is developed, air pump means, said pump means comprising an expansible chamber, an oscillating armature for periodically changing the volume of said chamber, a magnetic element carried by said armature, said magnet being disposed in the region of the alternating magnetic field developed by said motor for movement in accordance therewith, thereby causing said armature to be oscillated to produce a pumping action in said chamber.

References Cited
UNITED STATES PATENTS

| | | | |
|---|---|---|---|
| 2,552,261 | 5/1951 | Coughlin | 119—5 X |
| 3,080,495 | 3/1963 | Sudmeier. | |
| 3,273,717 | 9/1966 | Canterbury | 210—169 |
| 3,321,081 | 5/1967 | Willinger | 210—169 |
| 3,371,789 | 3/1968 | Hense | 210—169 |
| 3,392,836 | 7/1968 | Willinger | 210—169 |

FOREIGN PATENTS

| | | |
|---|---|---|
| 924,932 | 5/1963 | Great Britain. |

JAMES L. DE CESARE, Primary Examiner